(12) United States Patent
Dutra et al.

(10) Patent No.: US 8,999,032 B2
(45) Date of Patent: Apr. 7, 2015

(54) APPLICATION OF CARBON NANOTUBES ON AGGLOMERATES OF ORE FINES TO INCREASE THE MECHANICAL STRENGTH THEREOF

(75) Inventors: Flavio de Castro Dutra, Belo Horizonte (BR); Hamilton Porto Pimenta, Belo Horizonte (BR); Valdirene Gonzaga De Resende, Belo Horizonte (BR); Aloísio Antônio de Melo Borges, Belo Horizonte (BR)

(73) Assignee: Vale S.A., Rio de Janeiro (BR)

( * ) Notice: Subject to any disclaimer, the term of this patent is extended or adjusted under 35 U.S.C. 154(b) by 108 days.

(21) Appl. No.: 13/609,015

(22) Filed: Sep. 10, 2012

(65) Prior Publication Data
US 2013/0243973 A1    Sep. 19, 2013

Related U.S. Application Data

(60) Provisional application No. 61/532,420, filed on Sep. 8, 2011.

(51) Int. Cl.
*B01J 2/18* (2006.01)
*C22B 1/24* (2006.01)
*C22B 1/243* (2006.01)
*B82B 3/00* (2006.01)
*C01B 31/02* (2006.01)

(52) U.S. Cl.
CPC ... *B01J 2/18* (2013.01); *C22B 1/24* (2013.01); *C22B 1/243* (2013.01); *Y10S 977/702* (2013.01)

(58) Field of Classification Search
CPC ................................. C22B 1/16; C22B 1/244
USPC .................... 75/770, 300; 23/313 R; 977/702
See application file for complete search history.

(56) References Cited

U.S. PATENT DOCUMENTS

| | | | |
|---|---|---|---|
| 2003/0155143 A1* | 8/2003 | Fujieda et al. | 174/35 MS |
| 2004/0096389 A1* | 5/2004 | Lobovsky et al. | 423/447.1 |
| 2005/0061207 A1* | 3/2005 | Liu | 106/713 |
| 2013/0221562 A1* | 8/2013 | Garrett et al. | 264/118 |

* cited by examiner

Primary Examiner — George Wyszomierski
Assistant Examiner — Tima M McGuthry Banks
(74) Attorney, Agent, or Firm — Arent Fox LLP

(57) ABSTRACT

An application of carbon nanotubes on agglomerates of ore fines to increase the mechanical strength is provided. A process for the preparation of ore agglomerates having enhanced mechanical strength by the application of the carbon nanotubes is also provided.

12 Claims, 3 Drawing Sheets

APPLICATION OF CARBON NANOTUBES ON AGGLOMERATES OF ORE FINES TO INCREASE THE MECHANICAL STRENGTH THEREOF

This application claims priority from U.S. Patent Application No. 61/532,420, filed on Sep. 8, 2011, titled "Application of Carbon Nanotubes on Agglomerates of Fine Ore to Increase the Mechanical Strength Thereof," which is incorporated herein by reference in its entirety.

BACKGROUND OF THE INVENTION

This invention relates to the application of carbon nanotubes on agglomerates of ore fines to increase their mechanical strength. The present invention also refers to a process for the preparation of ore agglomerates having enhanced mechanical strength and to an agglomerate product having carbon nanotubes.

Nowadays, nanotechnology embodies several research areas, mainly engineering, chemistry, physics and biology. Various innovative products based on nanometric scale are already commercialized in the worldwide market. The carbon nanotubes technology is currently one of the hottest topics investigated by many research teams in the world due to their excellent mechanical, electrical and thermal properties. These special properties are due to the combination of the dimension and structure of the nanotubes. They are crystalline structures which have a cylindrical geometry with nanometric diameter composed only by carbon atoms. The possibilities of the use of the carbon nanotubes are countless, and the applications which are mainly explored nowadays are related to reinforcement of materials. Based on this scenario of possibilities, the present invention refers to the application of carbon nanotubes aiming to increase the mechanical strength of agglomerate products.

The physical strength of ore agglomerate products is one of the main quality requirements by metallurgical reactors and has a direct impact on the productivity and costs of the process. The carbon nanotubes technology opens a wide range of possibilities for application on the agglomeration routes of ore fines, working as a composite net which provides the agglomerate products, among other characteristics, high mechanical strength.

The state-of-the-art presents various technologies of cold agglomeration of ores. These technologies are based on the agglomeration of ore fines using binding agents such as cement, mortar, organic binders and carbonated residues. Associated to these binding agents, several additives are present to accelerate the agglomerated cure and improve their physical properties. Several patents show agglomeration technology for industrial residue applied in steelmaking and metallurgical industry using, among other additives, liquid sodium silicate. However, the application of carbon nanotubes as reinforcement for the silicate matrix aiming to increase the mechanical strength of agglomerated products has not been reported.

Document US2002152839 describes shaped bodies containing particulate iron materials, such as cast pellets, briquettes and alike, with sufficient strength to withstand temperatures of up to at least 1000° C. They can be obtained using a fully hydrated high-alumina cement as the binder. The strength of the pellets at elevated temperatures can be further enhanced by adding small amounts of bentonite, silica fume or other suitable supplementary cementing materials, and super plasticizer.

Document US2005061207 describes self-reducing, cold-bonded pellets that comprise iron ore concentrate, carbonaceous reducing agent, and finely divided Portland cement clinker with special requirements as binder. The components are combined together to form a mixture. Pellets are produced when the mixture is placed into a balling disc or rotating drum and water is added.

The present invention minimizes some of the problems on the production of agglomerates such as: the need of high addition of binding agents; low mechanical strength of agglomerates produced by cold routes; high generation of fines by transport and handling; high generation of fines by thermal chock; and contamination by undesirable elements derived from certain binding agents. The current invention minimizes the need of dosing various types of binding agents, does not add any new contaminants (except the carbon which is consider to benefit the agglomerate), increases significantly the mechanical strength of the agglomerate, reduces the generation of fines by transportation and handling, and allows the use of this product in reactors which need burden with high strength.

Table below compares the present invention with the conventional technology route, highlighting the main differences:

| Conventional Technologies | Present invention |
|---|---|
| Low mechanical strength | Fast cure with drying between 150 and 200° C. |
| Composition with several binding agents | Only one or two binding agents |
| Processes with higher energetic costs | Process with lower energetic cost |
| High cost of the binding agents | Moderate cost |
| Binding agents with various contaminants (residues) | Only $SiO_2$, $Na_2O$ and C |
| Low strength if in contact with water | Moderate strength in case of contact with water |
| Low mechanical strength at high temperatures | High mechanical strength at high temperatures |
| There are no evidences of technology which uses 100% of pellet feed without milling | Product produced from 100% of natural pellet feed (without milling process) or with milling (when desired) |

DETAILED DESCRIPTION OF THE DRAWINGS

The present invention will be described in more details based on the drawings below. The figures show:

OBJECTIVES OF THE INVENTION

Figure 1:
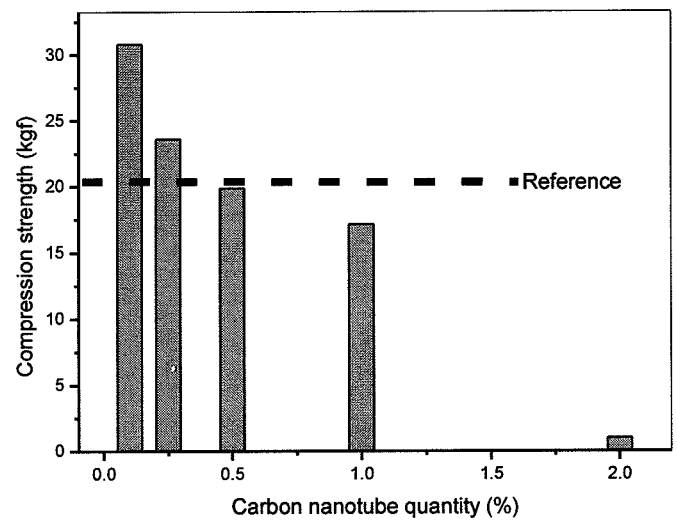
FIG. 1 shows the relation between the quantity of carbon nanotubes (with relation to the quantity of binding agent) and the compression strength of the agglomerated product.

The present invention refers to the application of carbon nanotubes on agglomerates of ore fines to increase the mechanical strength, comprising:

dispersing carbon nanotubes into a matrix by mechanical mixing or using ultrasonic processor;

performing a mechanical mixture with the ore; and agglomerating.

In addition, the present invention refers to a process for the preparation of ore agglomerates having high mechanical strength, comprising:

dispersion of carbon nanotubes into a matrix;

preparation of the mixture (addition of the binding agent to other constituents of the mixture);

pelletizing or briquetting or extruding;

screening the pellets/briquettes;

drying; and screening.

Furthermore, the present invention refers to an agglomerate product comprising ore fines, a matrix comprising binding agent and carbon nanotubes and, when necessary, other additives.

Moreover, the present invention refers to an use of carbon nanotubes to agglomerate ores fines in view to increase the mechanical strength thereof. Also, the ores fines can be selected from iron ore fines, nickel ore fines, manganese ore fines and mixture thereof.

DETAILED DESCRIPTION OF THE INVENTION

The study leading to the present invention was composed of five stages:

(i) dispersion of carbon nanotubes into a matrix (binding agent);

(ii) preparation of mixtures between said carbon nanotubes and raw materials for the production of agglomerated products;

(iii) measurement of the strength of said agglomerated products;

(iv) characterization of said agglomerated products by conventional techniques of materials characterization; and (v) assessment of the performance of said agglomerated products in pelletizing, sintering and reduction processes.

In a first step, carbon nanotubes were dispersed into a matrix (binding agent) by mechanical mixing or using ultrasonic processor. After dispersion, a mechanical mixture with ore was performed and followed by agglomeration. The carbon nanotubes are added in an amount that varies up to 5%.

The carbon nanotubes may be prepared by any technique already known for this purpose.

The developed products are agglomerates of iron, nickel and/or manganese ore containing (or not) coal, coke fines, petroleum coke, limestone, various residues and binders. These products are produced by the processes of pelletizing (product: pellet) or briquetting (product: briquette) using natural and/or milled pellet feed of iron and/or manganese and/or nickel ores without the necessity of cure at high temperatures.

The methodology to prepare the agglomerates uses preferably liquid sodium silicate ($SiO_2/Na_2O$ molar ratio from 2.15 to 3.90) as the major binding agent. It is heated up to a temperature around 60° C. and then added to the mixture. The liquid solid silicate is added into the mixtures of fine ore and fluxing agents in contents between 1.5 and 4.5%. Preferably, the carbon nanotubes are incorporated in the silicate in proportions which can vary up to 5%. The dispersion of the carbon nanotubes can be performed by mechanical mixtures or by using ultrasonic processor equipment.

After the dispersion of the carbon nanotubes into the matrix (binding agent being sodium silicate), all other optional constituents are submitted to the mixing process, followed by pelletizing in disk/drums or briquetting. The obtained products, i.e. pellet and briquette, are screened and submitted to drying process at temperatures between 150 and 200° C. The products show high mechanical strength in as-dried or at high humidity conditions in comparison with products which do not contain carbon nanotubes.

One can verify in FIG. 1 the strength gain of an agglomerated product of cold cure in which small quantities of carbon nanotubes were added. It was observed, and demonstrated in the aforesaid figure, that the application of 0.01% of carbon nanotubes (in relation to the quantity of binding agent) in a mixture of ore and binding agent increased the compression strength of the agglomerate by more than 50% in comparison with the reference sample, i.e. without the presence of nanotubes.

Optionally, others additives such as manioc and corn starch, as well as micron silica (residue retained in undusting filters used in the production of metallic silicon) can be applied in combination with the binding agent to improve the quality of the product. The manioc/corn starch may be used in the proportion between 0.5 and 1.0%, improving the strength and generation of fines by abrasion of the product. The micron silica may be combined with sodium silicate or be the unique binding agent in concentrations within the range of 0.3%-1.0% without deteriorating the mechanical strength of the product.

The technological route for the preparation of these products requires the following unit operations:

1. Dispersion of carbon nanotubes into a matrix (binding agent);

2. Preparation of a mixture: addition of the binding agent to other constituents of the mixture;

3. Pelletizing by disc (or drum) or briquetting;

4. Screening the pellets/briquettes;

5. Drying in conveyor belt furnace between a temperature that varies from 150° C. to 200° C.;

6. Screening.

The application of the present invention is rather large, because it allows the production of agglomerates from pellet feed and residues of iron, manganese and nickel ores with physical and metallurgical qualities able of being used in processes of agglomeration (sintering and pelletizing) and reduction (blast furnaces, direct reduction reactor, etc). Therefore, the present invention may be applied in mining and steelmaking industry.

The possibility of producing agglomerates by cold route performing agglomeration of pellet feed with good chemical quality could be an important alternative capable of promoting commercial and strategic benefits such as:

(i) correcting sinter feeds of lower cost, which lack of physical and chemical qualities;

(ii) allowing action over the mine split (sinter feed/pellet feed);

(iii) attending the demand of sinter feeds; which is currently without supply; and (iv) mainly generate market for more pellet feed which are without demand, besides promoting the production of pellets and self-reducer briquettes with high compression strength at high temperatures capable of being used in reduction reactors.

Tests

In view to confirm the increase of mechanical strength (or compressive strength) of the agglomerates by adding carbon nanotubes, some tests/assays were performed as disclosed below Evaluation of Adding Carbon Nanotubes in Alkaline Sodium Silicate—Test 01.

The property in question is the increase of the mechanical strength.

The formulation tested is:

| Component | Mass (%) |
|---|---|
| Pellet feed | 46.8% |
| Petroleum coke | 12.1% |
| Limestone | 6.8% |
| Sodium silicate (SiO$_2$/Na$_2$O = 2.15) | 3.0% |
| Starch | 1.5% |
| Organic binder | 0.2% |
| Fines <5 mm | 30.0% |

| Amount of carbon nanotube related to sodium silicate (%) | Sample |
|---|---|
| 0 | Reference |
| 0.05 | 005N |
| 0.1 | 01N |
| 0.25 | 025N |
| 0.5 | 05N |
| 1 | 1N |

The carbon nanotubes were dispersed in sodium silicate by an ultrasonic processor with 55% amplitude using a solid probe during 20 to 40 minutes, in 5 minutes intervals.

After that, this dispersion was mixed in an Eirich mixer during 2 minutes dry and more 2 minutes with water and bindings. Then, the briquettes were reached.

After briquetting, the content of good briquettes was determined. The humidity of such briquettes was also determined by drying 10 briquettes in a temperature of 110° C. during one hour.

The mechanical (compressive) strength was determined by submitting thirty green briquettes to compressive loads using a compression test equipment. The compressive strength test was carried out considering the smaller dimension of the briquette.

Other compressive strength test was carried out in cured briquettes in room temperature by seven days.

50% of good briquettes were dry/cured in a kiln to a temperature of 150° C. up to achieving humidity lower than 1%. Afterwards, 30 briquettes were tested in a Kratos press.

Other compressive strength test was carried out after assay in a radiant oven at 1250° C. in N$_2$ atmosphere. The fragments generated after such tests were analyzed to obtain the metallization degree.

It can be seen on the table below that the increase of compressive strength was confirmed using carbon nanotubes and sodium silicate as binding agent:

| | | Reference | 005N | 01N | 025N | 05N | 1N |
|---|---|---|---|---|---|---|---|
| Green briquettes | % good briquettes | 96.5 | 73.2 | 74.7 | 90.1 | 86.1 | 85.5 |
| | Humidity (%) | 9.0 | 9.4 | 9.7 | 8.5 | 8.8 | 8.8 |
| | Compressive strength green (Kgf) | 4.1 | 4.8 | 5.4 | 5.5 | 5.7 | 5.2 |
| | Bulk density (g/cm3) | 2.4 | 2.2 | 2.1 | 2.3 | 2.1 | 2.4 |

-continued

| | | Reference | 005N | 01N | 025N | 05N | 1N |
|---|---|---|---|---|---|---|---|
| Dried/cured briquettes | Humidity (%) | 0.1 | 0.1 | 0.0 | 0.1 | 0.0 | 0.0 |
| | Compressive strength dry (Kgf) | 53.8 | 51.3 | 52.7 | 76.6 | 83.7 | 72.1 |

It is possible to conclude that adding 0.25%/0.5% of carbon nanotubes in sodium silicate caused the increase of compressive strength of 42 and 56% respectively. This increase can be converted in reduction of binding dosage and consequently in the reduction of the agglomerated costs.

Evaluation of Adding Carbon Nanotubes in Alkaline Sodium Silicate—Test 02

Two formulations were tested using different kinds of binding agents and different methods to prepare the mixtures of binding agents with carbon nanotubes.

Formulation A

| Binding agents | Carbon nanotubes (%) | Mixture Details | Samples |
|---|---|---|---|
| 4% of silicate (regarding material dry base) Sodium silicate (SiO$_2$/Na$_2$O = 2.15) | 0<br>0.1<br>0.25<br>0.5<br>1.0 | Carbon nanotubes were dispersed in silicate using ultrasonic processor | Reference<br>01N<br>025N<br>05N<br>1N |

Formulation B

| Binding agents | Carbon nanotubes (%) | Mixture Details | Samples |
|---|---|---|---|
| 4% of silicate + 1% of starch (regarding material dry base) Sodium silicate (SiO$_2$/Na$_2$O = 2.15) | 0<br>0.25<br>0.5<br>1.0 | Carbon nanotubes were dispersed in silicate using ultrasonic processor | Reference<br>025N<br>05N<br>1N |

After preparing such mixtures, the samples were subjected to a pelletizing step resulting in pellets with medium diameter of 10 to 12 mm or mini pellets with diameter smaller than 6 mm. Then the samples were dried.

The samples were subjected to physical characterization through abrasion test, compressive strength of dried and wet pellets using Kratos press and compressive strength in high temperatures using radiant oven.

Figure 2A:
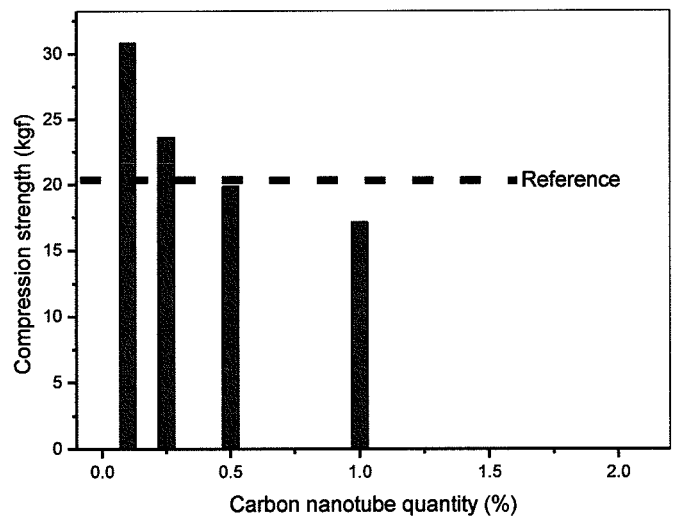
FIG. 2a shows mechanical strength of a first embodiment of dried pellets.
Figure 2B:
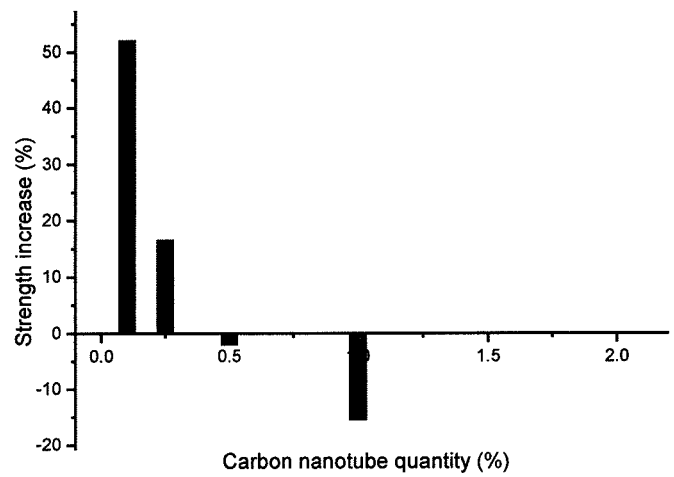
FIG. 2b shows the increase of compressive/mechanical strength related to carbon nanotubes used in preparing samples of the first embodiment.

The compressive strength tests of dried pellets show that the samples of Formulation A demonstrated a strength increase of up to 52% (with 0.1% nanotubes) as shown in FIGS. 2a and 2b.

Figure 3A:
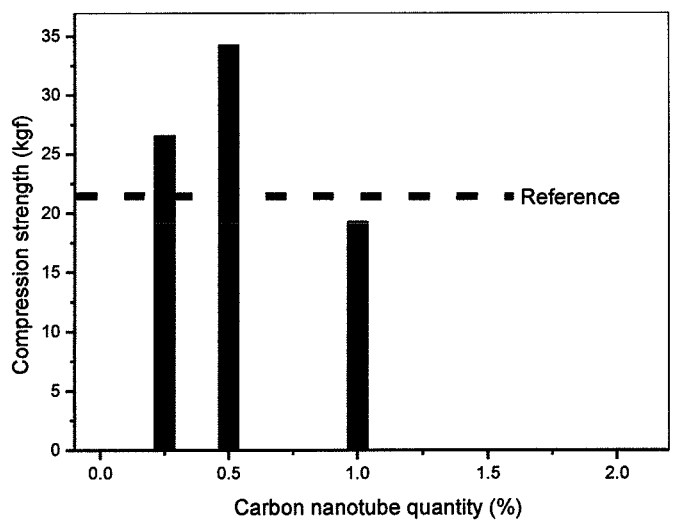
FIG. 3a shows mechanical strength of a second embodiment of the dried pellets.
Figure 3B:
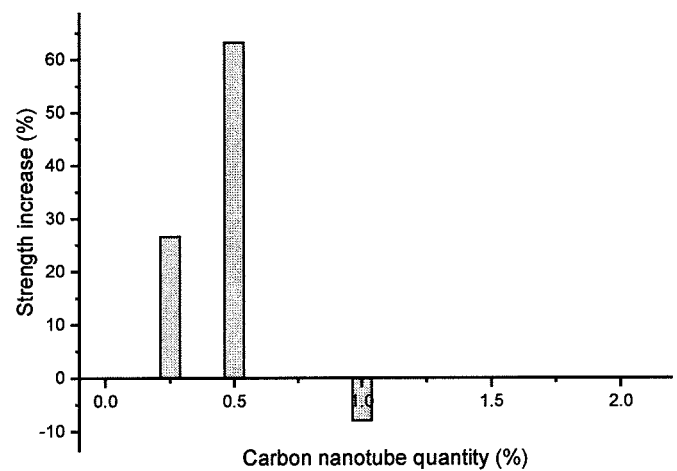
FIG. 3b shows the increase of compressive/mechanical strength related to carbon nanotubes used in preparing samples of a second embodiment.

The compressive strength tests of dried pellets show that the samples of Formulation B demonstrated a strength increase of up to 63% as shown in FIGS. 3a and 3b.

Figure 4:
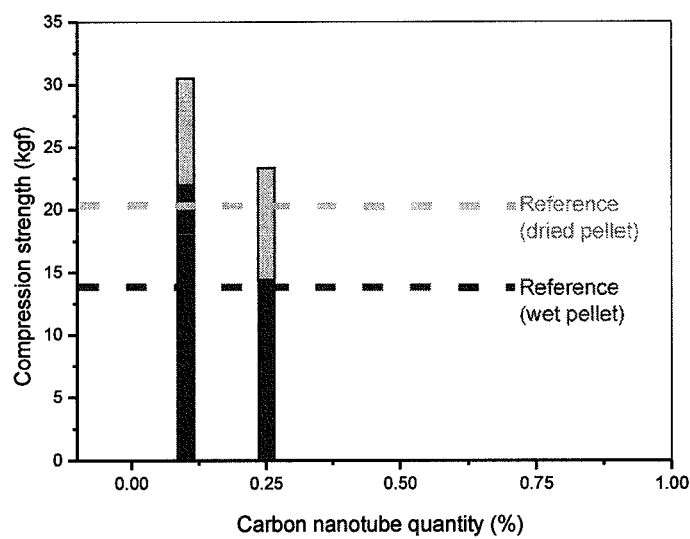
FIG. 4 shows mechanical strength of the wet pellets in comparison with the dried ones.

In the next step of this test, five pellets of each sample were submersed in water for five minutes. Right after that, the samples were subjected to a compressive strength test. The results are illustrated in FIG. 4. One can see in FIG. 4 that the result of the compression strength achieved with wet pellets is lower in comparison with the dried pellets, however, the mechanical strength is still high.

Evaluation of Adding Carbon Nanotubes in Alkaline Sodium Silicate—Test 03

Two formulations were tested to prepare iron ore pellets, using different amounts of carbon nanotubes.

| Components | Formulation A |
| --- | --- |
| Iron ore | 200 kg |
| Micron silica | 0.7% |
| Pre-gelatinized starch | 1.5% |
| Calcitic limestone | 0.96% |
| Sodium silicate ($SiO_2/Na_2O$ = 2.40) | 3% |

| Quantity of carbon nanotube related to silicate binding content (%) | Formulation A Samples |
| --- | --- |
| 0 | Reference |
| 0.1 | 010N |
| 0.2 | 02N |
| 0.35 | 035N |
| 0.5 | 05N |

| Components | Formulation A |
| --- | --- |
| Iron ore | 200 kg |
| Bentonite | 0.4% |
| Sodium silicate ($SiO_2/Na_2O$ = 2.40) | 0.4% |

| Quantity of carbon nanotube related to silicate binding content (%) | Formulation B Samples |
| --- | --- |
| 0 | Reference |
| 0.15 | 015N |
| 0.35 | 035N |

The carbon nanotubes were added to the sodium silicate, in which they were dispersed through an ultrasonic processor with 55% amplitude and with solid probe during 20-40 min, in a 5 minutes interval. The sodium silicate used has a molar ratio of $SiO_2/Na_2O$=2.40.

After that, this dispersion was mixed in an Eirich mixer during 2 minutes dry and more 2 minutes with water and bindings. Then, the pellets were produced in pelletizing disk, sieved and dried in kiln by two hours at 120° C. After drying, the compressive strength was determined in a Kratos press.

The compressive strength test results related to Formulation A are displayed in the table below:

| Formulation A Samples | Compressive strength (daN/p) | Strength increase (%) |
| --- | --- | --- |
| Reference | 46 | 0 |
| 010N | 42.6 | −7.2 |
| 02N | 35.3 | −23.2 |
| 035N | 91.3 | 98.7 |
| 05N | 83 | 80.6 |

It can be verified that the best results were achieved using higher concentrations of carbon nanotubes. This increase can be converted in reduction of binding dosage and consequently in the reduction of the agglomerated costs.

The invention claimed is:

1. An agglomerate product comprising:
   iron, nickel or manganese ore fines, or a mixture thereof; and
   a binding agent comprising sodium silicate and carbon nanotubes;
   wherein the agglomerate product has a mechanical strength higher than a corresponding agglomerate product without carbon nanotubes.

2. The agglomerate product of claim 1, wherein the agglomerates of ore fines have an increase in mechanical strength of about 52% to 63% as compared to agglomerates of ore fines without carbon nanotubes.

3. A method of applying carbon nanotubes on agglomerates of ore fines to increase the mechanical strength, comprising:
   dispersing carbon nanotubes into a matrix by mechanical mixing or by ultrasonic processing;
   performing a mechanical mixture with the ore fines; and
   agglomerating the mixture.

4. The method of claim 3, wherein the agglomerates of ore fines have an increase in mechanical strength of about 52% to 63% as compared to agglomerates of ore fines without carbon nanotubes.

5. The method of claim 4, wherein the agglomerates of ore fines are selected from a group consisting of iron ore fines, nickel ore fines, manganese ore fines and mixtures thereof.

6. A process for the preparation of ore agglomerates having high mechanical strength, comprising:
   dispersing carbon nanotubes into a matrix to form a mixture;
   preparing the mixture;
   pelletizing or briquetting or extruding the mixture to form pellets or briquettes;
   screening the formed pellets or briquettes;
   drying the pellets or briquettes; and
   screening the pellets or briquettes.

7. The process of claim 6 wherein the matrix comprises at least a binding agent.

8. The process of claim 7 wherein the binding agent comprises liquid sodium silicate.

9. The process of claim 7 wherein the matrix comprises additives including at least one of manioc, corn starch and micron silica.

10. The process of claim 6 wherein:
    dispersing the carbon nanotubes is performed by mechanical mixtures or by using ultrasonic processor equipment,
    pelletizing is performed by using a disc or drum, and
    drying is performed in a conveyor belt furnace at temperatures between about 150 to 200.degree. C.

11. The process of claim 6 wherein the carbon nanotubes are incorporated in the matrix in proportions up to 5% by mass.

12. The process of claim 6, wherein the ore agglomerates comprise a material selected from the group consisting of iron ore fines, nickel ore fines, manganese ore fines, and mixtures thereof.

* * * * *